United States Patent [19]

Roney

[11] Patent Number: 5,101,326

[45] Date of Patent: Mar. 31, 1992

[54] LAMP ASSEMBLY FOR MOTOR VEHICLE

[75] Inventor: Troy L. Roney, Madison, Ind.

[73] Assignee: The Grote Manufacturing Co., Madison, Ind.

[21] Appl. No.: 589,028

[22] Filed: Sep. 27, 1990

[51] Int. Cl.⁵ .............................................. B60Q 1/32
[52] U.S. Cl. ...................................... 362/61; 362/80; 362/226; 362/249; 362/800
[58] Field of Search .................. 362/61, 80, 83.3, 226, 362/249, 252, 800

[56] References Cited

U.S. PATENT DOCUMENTS

| | | | |
|---|---|---|---|
| 2,300,067 | 10/1942 | Schwab | 362/61 |
| 4,079,442 | 3/1978 | Tuerck | 362/80 |
| 4,547,840 | 10/1985 | Tinder | 362/226 |
| 4,733,335 | 3/1988 | Serizawa et al. | 362/80 |
| 4,893,223 | 1/1990 | Arnold | 362/800 |
| 4,935,665 | 6/1990 | Murata | 362/61 |
| 4,951,179 | 8/1990 | Machida | 362/61 |
| 4,953,065 | 8/1990 | Kao | 362/80 |
| 4,997,196 | 3/1991 | Wood | 362/61 |

FOREIGN PATENT DOCUMENTS 987644  4/1976  Canada ............................ 362/80

Primary Examiner—Ira S. Lazarus
Assistant Examiner—Y. Quach
Attorney, Agent, or Firm—Jon C. Winger

[57] ABSTRACT

A lamp for a motor vehicle, such as a side marker or clearance lamp which uses light-emitting diodes instead of incandescent bulbs. The lamp includes a housing which accurately positions the light-emitting diodes to provide a desired light pattern. The housing includes a pair of fixture halves which are positioned in facing abutment to form a fixture for positioning and holding the light-emitting diodes in place. Each fixture half includes light-emitting diode positioning grooves which cooperate when the fixture halves are assembled to accurately position and hold the light-emitting diodes in desired positions. A transparent lens is positioned over the housing.

12 Claims, 4 Drawing Sheets

LAMP ASSEMBLY FOR MOTOR VEHICLE

BACKGROUND OF THE INVENTION

The present invention relates to lamps used on motor vehicles, and more particularly to a lamp construction using light emitting diodes as the light source.

The term motor vehicle is used herein in a generic sense to mean automobiles, truck tractors, trailers of all types, motorcyles, and recreational vehicles such as boats, snowmobiles and the like, as well as aircraft. The above list is not all inclusive because new vehicles requiring lamps which move, or are moved on roads, waterways, and in the air will continually be developed.

Numerous problems exist with lamps presently used on motor vehicles. For example, present lamps, such as for example clearance and side marker lamps used on automobiles, truck tractors, and trailers, use standard high-intensity incandescent bulbs as a light source, and an optical lens over the bulb to provide a proper photometric light pattern. The lens also protects the bulb from damage from road debris and moisture. These high-intensity bulbs have a relatively short life and, therefore, must be frequently replaced. Further, in practice, it often happens that burned-out incandescent bulbs are not promptly replaced resulting in an unsafe vehicle condition.

Recent technology has developed light-emitting diodes which are a viable light source for various motor vehicle lamps such as side marker lamps and clearance lamps. An advantage of these light-emitting diodes is that they have an operating life of as much as 100,000 hours before they begin to degrade. However, a problem with the use of light-emitting diodes for motor vehicle lamps is that the position of the light-emitting diodes is very critical in order for the lamp to provide proper photometric criteria, for example, the photometric requirements of applicable United States Federal Motor Vehicle Safety Standards.

SUMMARY OF THE INVENTION

The present invention recognizes the advantage of light-emitting diodes for use as the light source in motor vehicle lamps, and provides a novel solution to the problem of positioning the light-emitting diodes to conform to photometric requirements.

The present invention provides a motor vehicle lamp for a motor vehicle which has a fixture for supporting and locating a plurality of light-emitting diodes in a predetermined mutual relationship.

The present invention further provides a motor vehicle lamp having a fixture for supporting and locating a plurality of light-emitting diodes such that the light pattern emitted by adjacent ones of the light-emitting diodes overlap.

The present invention further provides a motor vehicle lamp having a fixture formed of a pair of identical fixture halves disposed in mating mirror image relationship to each other, each fixture half having a plurality of spaced-apart grooves for receiving therein a light-emitting diode, and wherein when the fixture halves are positioned in mutual mating relationship, each of the grooves of one fixture half is mated in facing registered relationship with a different one of the grooves in the other fixture half mutually cooperating and defining a plurality of spaced-apart light-emitting diode receiving sockets, each socket circumferentially gripping a different one of the light-emitting diodes.

BRIEF DESCRIPTION OF THE DRAWINGS

A better understanding of the present invention will be had upon reference to the following discussion in conjunction with the accompanying drawings in which like numerals refer to like parts throughout the several views and wherein.

DETAILED DESCRIPTION OF THE PREFERRED EMBODIMENT

Figure 1:
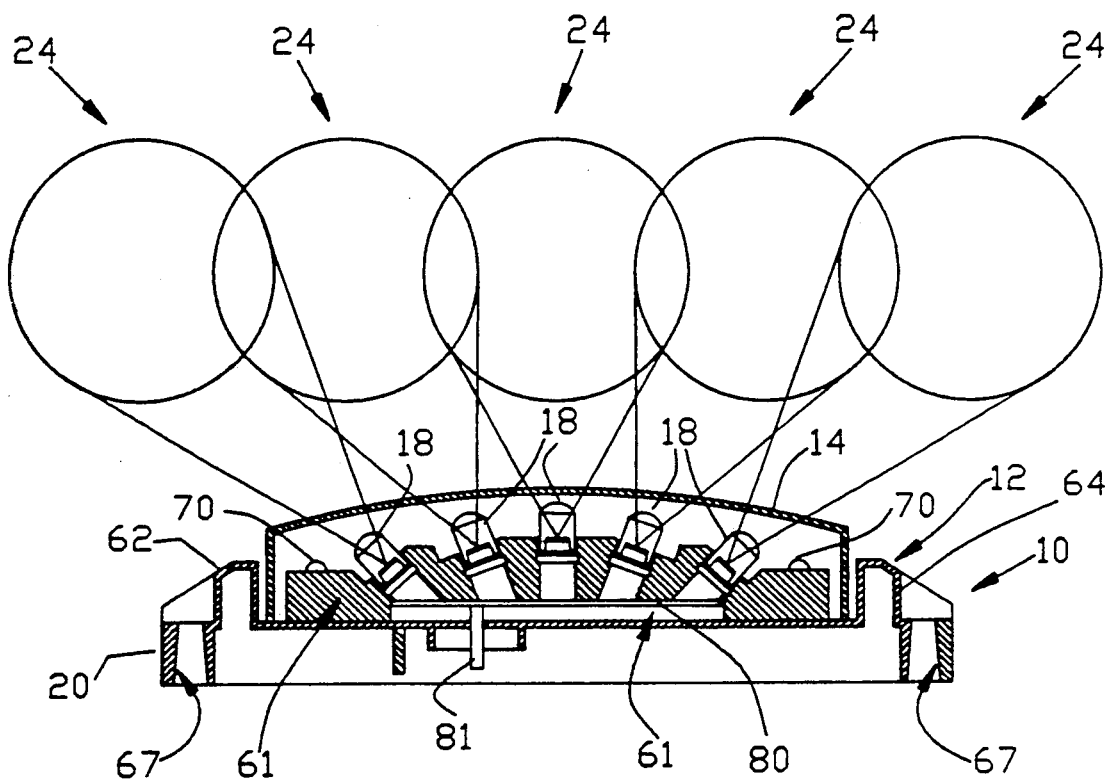
FIG. 1 is a cross-sectional side view of a motor vehicle side marker/clearance lamp of the present invention.
Figure 2:
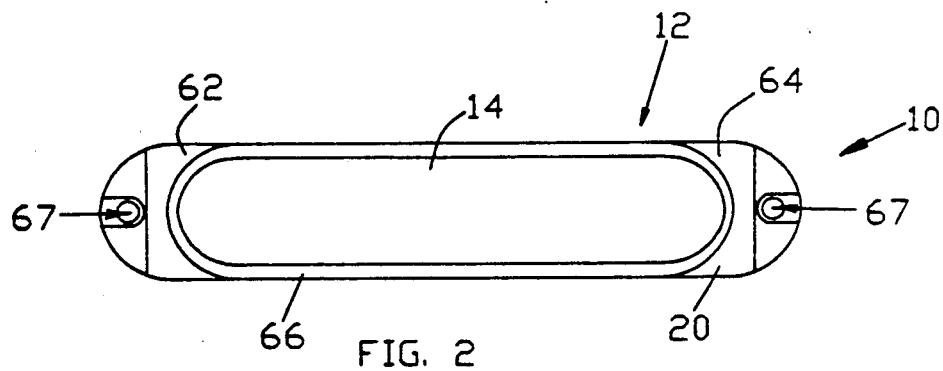
FIG. 2 is a top view of the motor vehicle side marker/clearance lamp of FIG. 1.

With reference to FIGS. 1 and 2, there is shown a lamp assembly, generally denoted as the numeral 10, for example, a side marker/clearance lamp for a motor vehicle such as a passenger car, truck tractor, or trailer and the like. The lamp assembly 10 includes a lamp housing 12 covered by a lens 14. Preferably, the lens 14 is non-optical. Further, the lens 14 can be clear, red, amber, or any color which may be required for different applications or uses.

With continued reference to FIGS. 1 and 2 and additional reference to FIGS. 3 through 9, the lamp housing 12 includes fixture means, generally denoted as the numeral 16, a plurality of light-emitting diodes 18 and a mounting base 20 for mounting the lamp assembly 10 to a motor vehicle (not shown).

With reference to FIGS. 1, and 3-7, the fixture means 16 includes light-emitting diode positioning and holding means, generally denoted by the numeral 22, for holding the light-emitting diodes 18 in a preselected or specified position relative to each other to provide a predetermined light pattern, generally denoted as the numeral 24 (see FIG. 1). The light-emitting diode positioning and holding means 22 includes a plurality of spaced-apart sockets 26 formed through the fixture means 16, each socket 26 receiving and circumferentially engaging a different one of the light-emitting diodes 18 circumferentially gripping the light-emitting diodes 18.

With continued reference to FIGS. 1 and 3 through 7, the fixture means 16 comprises a pair of identical fixture halves, such as a first fixture half 28A and a second fixture half 28B disposed in mating, mirror image relationship to each other. The fixture halves 28A and 28B being identical, and, therefore, for the sake of brevity and clearness of description, the following discussion will be phrased in the singular and refer to fixture half 28, it being fully understood that the description applies equally to both the first and second fixture halves 28A and 28B. The fixture half 28 comprises a bottom side 30, an outer side surface 32, an inner side surface 34, and a top surface 36. The inner side surface 34 is formed with a plurality of spaced apart light-emitting diode receiving channels or grooves 38 extending from the fixture half bottom surface 30 to the fixture half top surface 36. With the first fixture half 28A and second fixture half 28B disposed in mating mirror image relationship with the inner side surfaces 34 thereof in mutually facing abutment (see FIGS. 3 and 4) each of the grooves 38 in the first fixture half 28A are in facing registered relationship with a different one of the grooves 38 in the second fixture half 28B defining therebetween the light-emitting diode positioning and holding sockets 26. As can be best seen in FIGS. 3, 4, and 5, the fixture half 28 further includes a plurality of resilient light-emitting diode engaging fingers 40 at the top surface 36, each of the fingers 40 extending generally radially of a different one of the grooves 38 with the distal end of the finger 40 extending pass the wall of the groove 38 a distance across or into the groove 38. With the first fixture half 28A and second fixture half 28B disposed in mating mirror image relationship with the inner surfaces 34 thereof in mutually facing abutment (see FIG. 3 and 4) the fingers 40 of the first fixture half 28A are each in longitudinal alignment with a different one of the fingers 40 of the second fixture half 28B, and the distal ends of the aligned fingers 40 are spaced apart from each other by a distance less than the diameter of the light-emitting diode receiving socket 26 formed by facing registered grooves 38, and less than the diameter of the light-emitting diodes 18.

Figure 3:
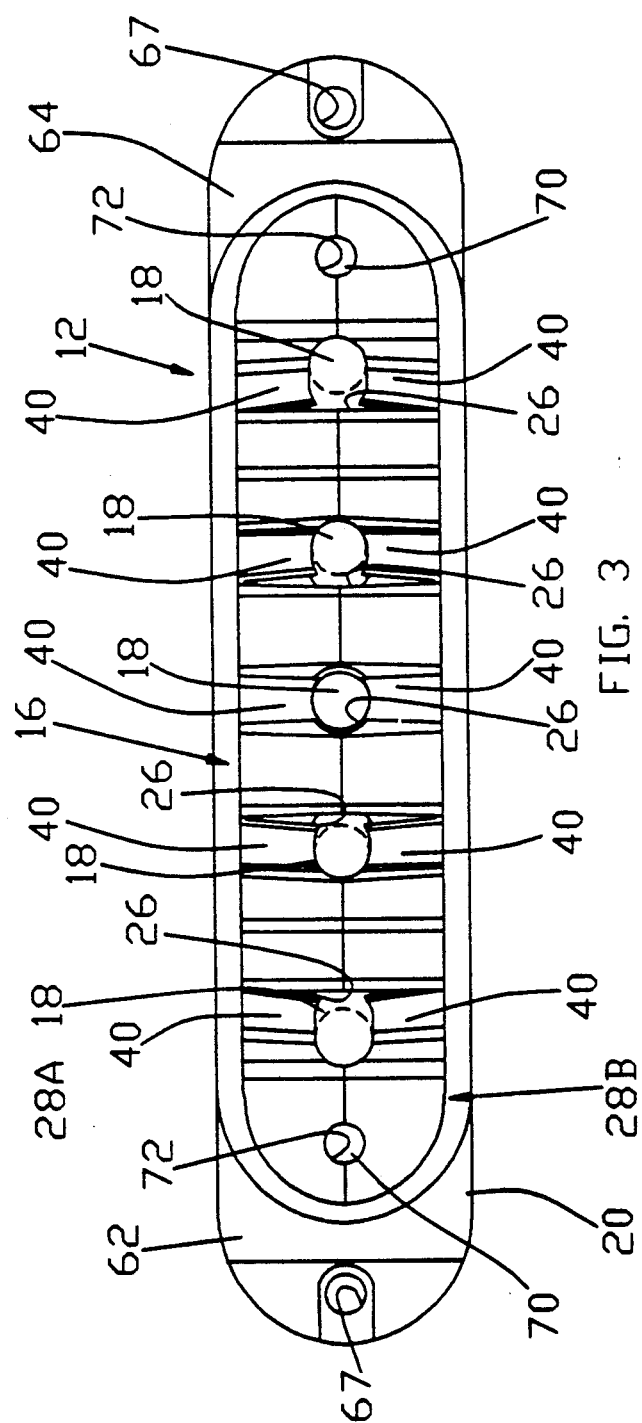
FIG. 3 is a sectional top view of the motor vehicle side marker/clearance lamp of FIG. 1.
Figure 10:
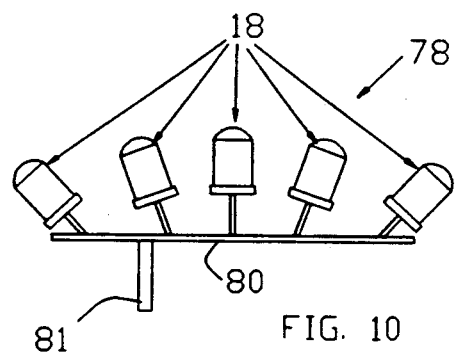
FIG. 10 is a side view of the light-emitting diode sub-assembly of sthe motor vehicle side marker/clearance lamp of FIGS. 1 and 2.

In the particular lamp assembly 10, which is suitable as a side marker/clearance lamp, in profile or side view (see FIGS. 1, 3, and 10, the light-emitting diodes 18 are arranged in an arcuate array to provide an arcuate light pattern 24. This is accomplished by forming the light-emitting diode-receiving sockets 26 in an arcuate array, in profile of the fixture means 16, with the longitudinal axis of the sockets 26 in non-parallel relationship. Toward this objective, the fixture half 28 is formed with the grooves 38 in the inner side surface 34 with their longitudinal axes 44 in non-parallel relationship to each other. In this respect, the fixture half 28, and therefore the fixture means 16, are symmetrical about the transverse centerline with the longitudinal axes 44 of the center one of the grooves 38 in alignment with the transverse centerline of the fixture half 28 and the other grooves 38 equally divided in number to opposite sides of the transverse centerline and symmetrically angularly oriented with respect to the transverse centerline. With this arcuate orientation of the grooves 38, it is advantageous that the top surface 36 of the fixture half 28 also be generally convexly shaped with an arc generally matching the arc formed by the grooves 38 so that each light-emitting diode 18 extends outwardly from the fixture top surface 36 by the same amount. The angle between the longitudinal axes 44 of adjacent grooves 38 is selected to provide a predetermined relationship of the light pattern generated by the light-emitting diodes 18. In the case of side marker/clearance lamps, the angle between the longitudinal axes 44 of adjacent grooves 38 is selected to provide an overlap of the light patterns 24 emitted by the light-emitting diodes 18 in the sockets 26 of the fixture means 16 defined by the grooves 38 of the fixture halves 28 (see FIG. 1).

Figure 4:
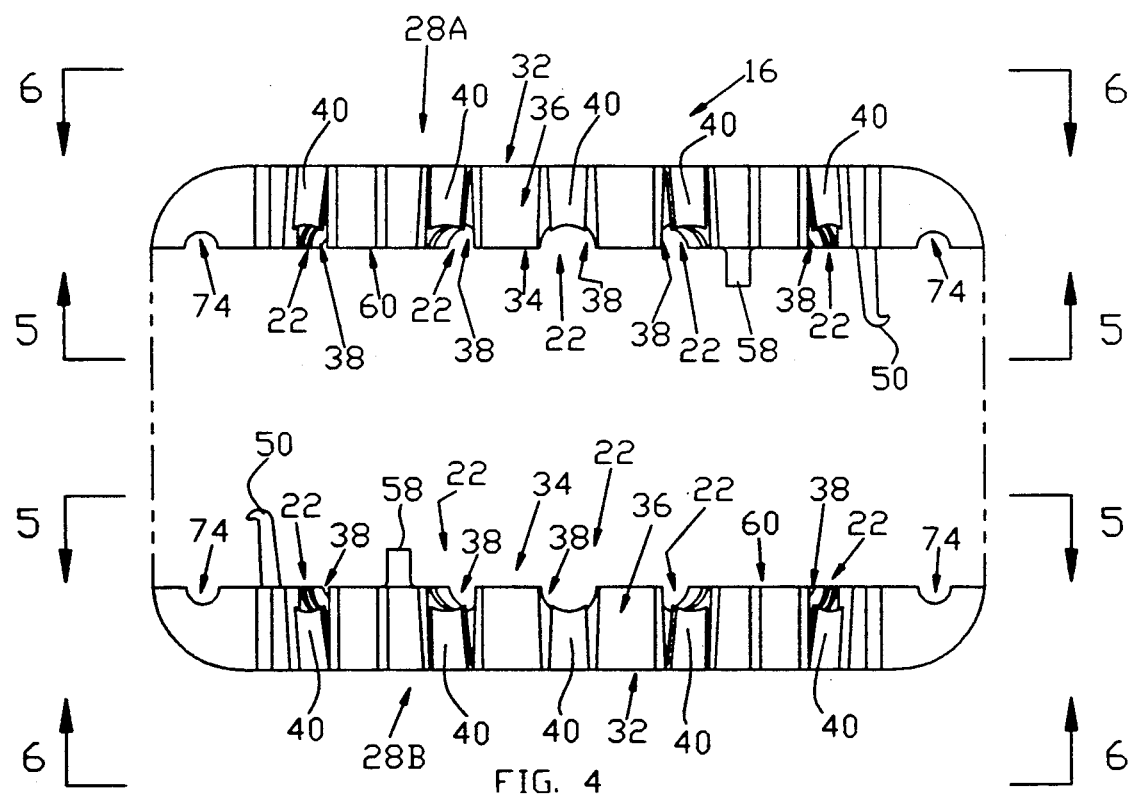
FIG. 4 is an exploded top view of a fixture of the side marker/clearance lamp of FIGS. 1-2.
Figure 8:
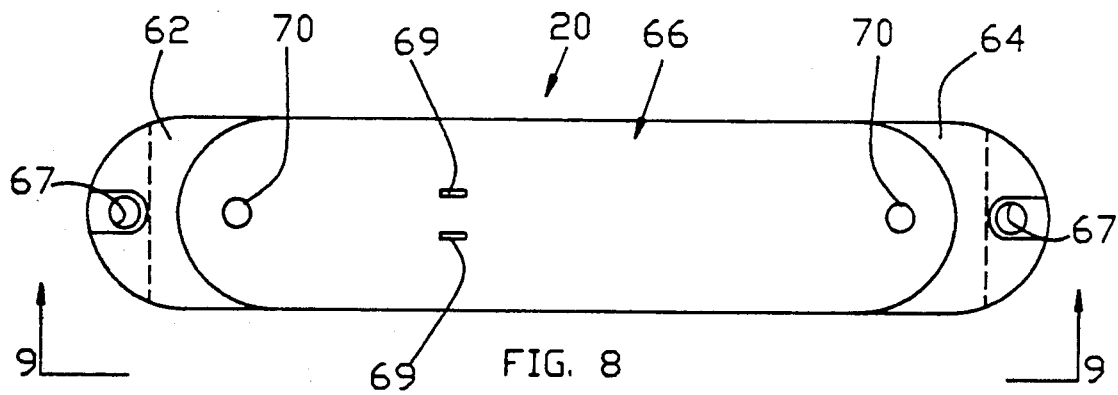
FIG. 8 is a top view of the mounting base component of the motor vehicle side marker/clearance lamp of FIGS. 1-2.
Figure 9:
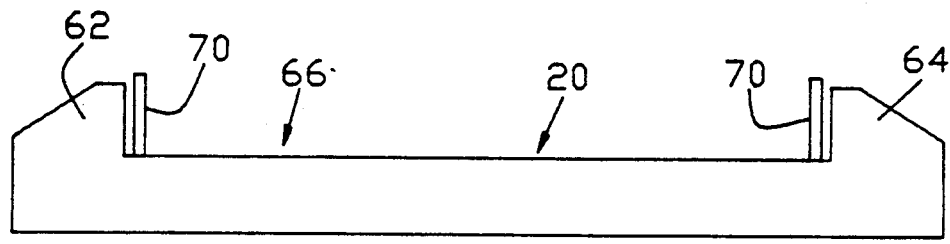
FIG. 9 is a side view of the mounting base component as seen in the direction of arrows 9—9 in FIG. 8.

Now with reference to FIGS. 4 through 7, the fixture half 28 further includes fastening means for fastening a pair of the fixture halves 28A, 28B together in mirror image relationship with each other with the inner side surfaces 34 thereof in facing abutment as can be best seen in FIGS. 3 and 4. As shown in FIGS. 4 through 7, the fastening means comprises a resilient hook member 50 extending outwardly from the inner side surface 34 of the fixture half 28 proximate one end thereof, and a hook receiving aperture 52 formed through the fixture half 28 from the inner side surface 34 to the outer side surface 32 proximate the other end thereof. The resilient hook member 50 is spaced from one end of the fixture half 28 by the same distance that the hook receiving aperture 52 is spaced from the other end of the fixture half 28. The hook receiving aperture 52 is further formed with a shelf 54 recessed from the outer side surface 32 of the fixture half 28 to receive the barbed end of the hook 50. When two fixture halves 28A and 28B are disposed in mating mirror image relationship with the inner side surfaces 34 in facing abutment, the hook member 50, the first fixture half 28A is received through the hook receiving aperture 52 of the second fixture half 28B with the barbed end of the hook member 50 received in the shelf 54, and the hook member 50 of the second fixture half 28B is received through the hook receiving aperture 52 of the first fixture half 28A with the barbed end of the hook member 50 received in the shelf 54. The coaction of the barbed ends of the hook members 50 and the shelves 54 of the hook receiving apertures 52 tightly attach the fixture halves 28A and 28B together. This feature aids in the rapid assembly of the two fixture halves 28A and 28B to form the fixture means 16 without the aid of tools.

In addition, the fixture half 28 includes locating means for properly locating the first fixture half 28A relative to the second fixture half 28B in mating mirror image relationship. As shown, the locating means includes a locating pin 58 projecting perpendicularly outwardly from the inner side surface 34 of the fixture half 28 proximate one end thereof, and a complementary locating pin-receiving hole 60 formed in the inner side surface 34 of the fixture half 28 proximate the other end thereof. The locating pin 58 is spaced from the one end of the fixture half 28 by the same distance that the locating pin receiving hole 60 is spaced from the other end of the fixture half 28. When two fixture halves 28A and 28B are disposed in mating mirror image relationship with the inner side surfaces 34 in facing relationship, the locating pin 58 of the first fixture half 28A will be in alignment with the locating pin receiving hole 60 of the second fixture half 28B, and the locating pin 58 of the second fixture half 28B will be in alignment with the locating pin receiving hole 60 of the first fixture half 28A to assure a mating relationship of the first fixture half 28A and second fixture half 28B. In order to attach or fasten the first fixture half 28A and second fixture half 28B together, with the hook member 50 of the first fixture half 28A received through the hook receiving aperture 52 of the second fixture half 28B and the hook member 50 of the second fixture half 28B received through the hook receiving aperture 52 of the first fixture half 28A, it is only necessary to apply a relatively small force to the fixture halves 28A and 28B pushing them toward each other until the barbed end of the hook member 50 of the first fixture half 28A is received in and engages the shelf 54 of the hook receiving aperture 52 of the second fixture half 28B and the barbed end of the hook member 50 of the second fixture half 28B is received in and engages the shelf 54 of the hook-receiving aperture 52 of the first fixture half 28A.

With reference to FIGS. 1, 5, 6, and 7, the fixture half 28 further includes a recess 61 formed in the bottom surface 30 for receiving the circuit board 80 of the light-emitting diodes 18 as will hereinafter be discussed.

Figure 7:
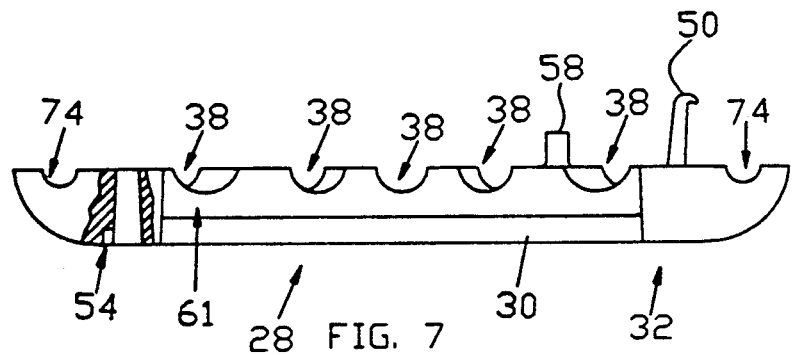
FIG. 7 is a bottom view of one of the fixture half components of FIG. 4 as seen in the direction of arrows 7—7 in FIG. 5.
Figure 5:
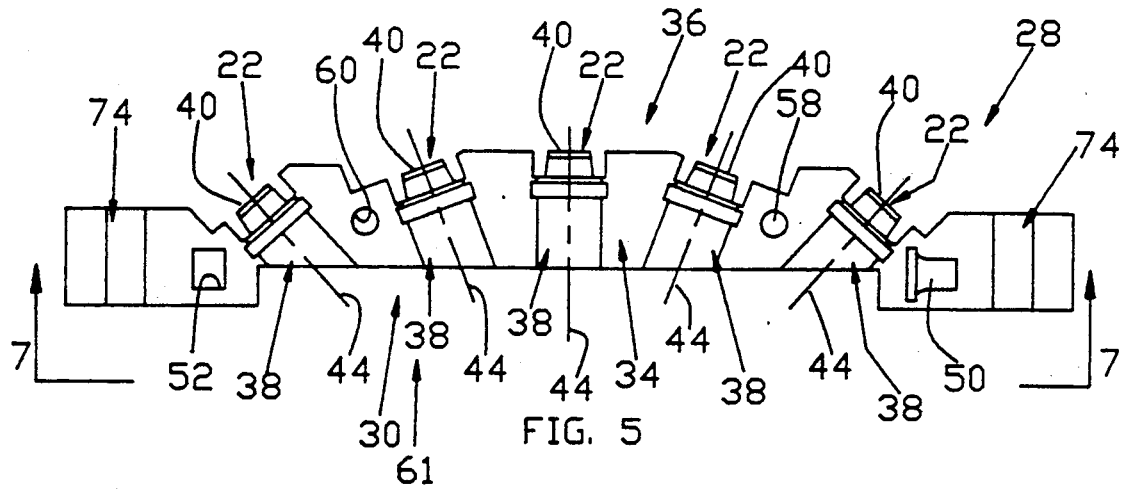
FIG. 5 is an inner side view of one of the fixture half components of the FIG. 4 as seen in the direction of arrows 5—5 in FIG. 4.
Figure 6:
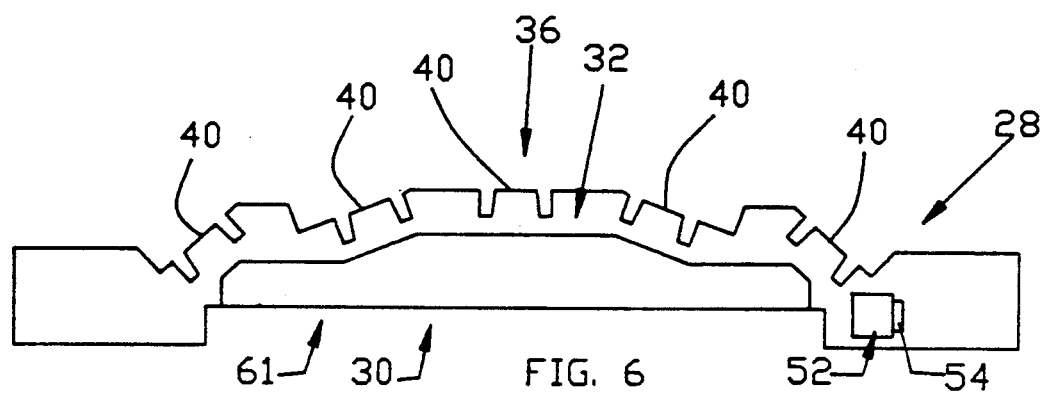
FIG. 6 is an outer side view of one of the fixture half components of FIG. 4 as seen in the direction of arrows 6—6 in FIG. 4.

Now with reference to FIGS. 1, 2, and 3, the fixture means 16 is attached to the mounting base 20, and the mounting base 20 is utilized to mount the lamp assemly 10 to a panel of a vehicle. The mounting base 20 is shown as being substantially longer than the fixture means 16 and somewhat wider than the fixture means 16. Also, as shown, the mounting base 20 is formed with two raised ends 62, 64 at its top side defining a recessed platform area 66 between the raised ends 62, 64. The fixture means 16 is located on the platform area 66 coaxial with the longitudinal axis of the mounting base 20 with the ends of the fixture means 16 spaced from the adjacent raised ends 62, 64 of the mounting base 20, and with the lateral sides of the fixture means 16 spaced inwardly of the mounting base 20 from the adjacent lateral sides of the mounting base 20. Two lamp mounting bores 67 are formed through the raised ends of the mounting base 20. In addition, the mounting base 20 is also formed with electrical connector receiving apertures 69 through the platform 66 of the mounting base 20. With continued reference to FIGS. 1, 3, 4, 8, and 9, and additional reference to FIGS. 4 and 5, the fixture means 16 is attached to the mounting base 20 by attachment means, shown as comprising two spaced apart, parallel posts 70 extending upwardly from and perpendicular to the platform area 66 of the mounting base 20, and two spaced apart post-receiving apertures 72 formed through the fixture means 16 and spaced apart from each other by the same distance separating the posts 70. With particular reference to FIGS. 4, 5 and 7, the post-receiving apertures 72 are defined by registered channels 74 formed in the fixture half 28. More specifically, the inner surface 34 of the fixture half 28 is formed with two spaced apart channels 74 proximate either end of the fixture half 28 and extending from the fixture half bottom surface 30 to the fixture half top surface 36. With the fixture half 28A and second fixture half 28B disposed in mutual mirror image relationship with the inner side surfaces 34 thereof in mutually facing abutment (see FIGS. 3 and 4) each of the channels 74 in the first fixture half 28A are in facing registered relationship with a different one of the channels 74 in the second fixture half 28B defining therebetween the post-receiving apertures 72. To assemble the fixture means 16 to the mounting base 20, the fixture means 16 is positioned over the platform area 66 in longitudinal alignment with the mounting base 20 with the post-receiving apertures 72 in registration with the posts 70, and then the fixture means 16 is displaced toward the platform area 66 until it rests on the platform area 66 and the posts 70 are received through the post-receiving apertures 72 of the fixture means 16 protruding outwardly therefrom at the top side of the fixture means 16. The protruding top ends of the posts 70 are then upset or flared to form a head securing the fixture means 16 to the mounting base 20.

Now with reference to FIGS. 1, 3, and 10, there is shown a light-emitting diode subassembly, generally denoted as the numeral 78, which comprises the light-emitting diodes 18 electrically associated with an appropriate circuit board 80. The circuit board 80 is planar having a length approximately equal to the length of the recess 61 in the bottom side of the fixture means 16 and a width approximately equal to the width of the fixture means 16. The light-emitting diodes are oriented in an arcuate array or configuration in profile of the diode subassembly 78 (see FIGS. 1 and 10) which arcuate array conforms or complements the arcuate configuration of the grooves 28 of the fixture halves 28A, 28B and, therefore, the arcuate array of the diode receiving sockets 26 of the fixture means 16. The light-emitting diode subassembly 78 is positioned relative to the fixture means 16 with each of the light-emitting diodes 18 received in a different one of the sockets 26 of the fixture means 16 and protruding outwardly past the top side of the fixture means 16, and with the circuit board 80 positioned in the recess 61 in the bottom side of the fixture means 16. The wall surface of the light-emitting diode receiving sockets 26 will engage the light-emitting diodes 18 holding them in position and securing the light-emitting diode subassembly 78 to the fixture means 16. In addition, the distal ends of the diametrically disposed resilient diode securing fingers 40 associated with each light-emitting diode receiving socket 26 cooperate to firmly clamp the light-emitting diode 18 in that socket 26 therebetween to further assure the clamping of the diode 18 in the socket 26. Thusly, even if a tolerance stack-up between the circumference of the light-emitting diode 18 and a light-emitting diode receiving socket 26 results in a loose fit of a diode 18 in a socket 26, the opposed resilient diode securing fingers 40 will, themselves, tightly hold the light-emitting diode 18 in position and secure it in place in the socket 26.

In the assembly of the lamp assembly 10, prior to positioning the fixture means 16 to the mounting base 20, the diode subassembly 78 is assembled to the fixture means 16. This is accomplished by positioning the diode subassembly 78 at the first fixture half 28A by inserting each one of the diodes 18 in a different one of the light-emitting diode receiving grooves 38 through the side of the grooves 38 open to the inner side surface 34 of the first fixture half 28A and with the top side of the circuit board 80 of the diode subassembly 78 in registration with the recess 61 in the bottom surface 30 of the first fixture half 28A and with the electrical connectors 81 of the circuit board 80 depending from the bottom side. Once the diode subassembly 78 is properly positioned in the first fixture half 28A with each of the diodes 18 received in a different one of the grooves 38 and the circuit board 80 in the recess 61 thereof, the second fixture half 28B is positioned in mating mirror image relationship to the first fixture half 28A. When the locating pin 58 of the first fixture half 28A is in alignment with the locating pin receiving hole 60 in the second fixture half 28B and when the locating pin 58 of the second fixture half 28B is in alignment with the locating pin receiving hole 60 in the first fixture half 28A, the fixture halves 28A and 28B are pushed toward each other. When the inner side surfaces 34 of the first and second fixture halves 28A and 28B are in facing abutment, the barbed end of the hook member 50 of the first fixture half 28A engages the barb receiving shelf 54 of the hook receiving aperture 52 of the second fixture half 28B, and the barbed end of the hook member 50 of the second fixture half 28B engages the barb receiving shelf 54 of the hook receiving aperture 52 of the first fixture half 28A securing the first and second fixture halves 28A, 28B together. The assembled fixture means 16 including the diode subassembly 78 is then positioned on the platform area 66 of the mounting base 20 with the electrical connectors 81 of the diode assembly 78 extending through the electrical connector receiving aperture 69 in the platform 66 of the mounting base 20, and the assembled fixture 16 is fastened to the mounting base 20 as described above.

Now with particular reference to FIGS. 1 and 2, after the fixture means 16 including the diode subassembly 78 has been positioned on and attached to the mounting base 20 forming the housing 12, the lens 14 is positioned over the platform area 66 of the mounting base 20 concavely facing and covering the fixture means 16 and the light-emitting diodes 18. The lens completely surrounds the fixture means 16 with the peripheral distal end of the side walls of the lens 14 in abutment with the surface of the recessed top platform 66 of the mounting base 20 circumferentially adjacent the fixture means 16. The lens 14 is secured to the mounting base 20 by, for example, a moisture proof adhesive at the interface of the distal edge of the lens 16 and recessed top platform 66 of the mounting base 20, or by welding the lens 14 to the top platform 66. Thusly, the interior volume defined by the lens 16 and recessed top platform 66 of the mounting base 20 encloses the fixture means 16 and light-emitting diodes 18 protecting them from moisture and dirt which could adversely effect the optical light pattern generated by the light-emitting diodes 18 and shorten the life of the light-emitting diodes 18.

The lamp assembly 10 is mounted to a vehicle by placing the bottom side of the mounting base 20 against an exterior surface, and attaching it thereto by various known, or otherwise convenient, methods. For example, the lamp assembly 10 could be adhesively secured to the vehicle. However, as shown, the lamp assembly 10 is attached to the vehicle by means of threaded fasteners, such as screws or bolts, (not shown) inserted through the lamp mounting bores 67 in the raised ends 62,64 of the mounting base 20.

The foregoing detailed description is given primarily for clearness of understanding and no unnecessary limitations are to be understood thereby for modifications will become obvious to those skilled in the art upon reading this disclosure and may be made without departing from the spirit of the invention and scope of the appended claims.

What is claimed is:

1. A lamp assembly for a motor vehicle comprising:
   a fixture having a top side and a bottom side formed with a plurality of spaced apart light-emitting diode receiving sockets therethrough from the bottom side to the top side;
   a light-emitting diode subassembly including a circuit board and a plurality of spaced apart light-emitting diodes electrically associated with the circuit board, the light-emitting diode subassembly being positioned with each of the light-emitting diodes each received in a different one of the sockets of the fixture; and,
   a pair of diametrically opposed resilient diode engaging fingers extending radially over the top of each diode-receiving socket, the distal ends of the fingers being spaced apart across the top of the diode-receiving socket by a distance less than the transverse width of a diode received in the socket to tightly grip the diode therebetween, the proximal ends of the resilient fingers being attached to the top side of the fixture.

2. The lamp assembly of claim 1, wherein the light-emitting diode subassembly is positioned with the circuit board in juxtaposition to the bottom side of the fixture.

3. The lamp assembly of claim 1, wherein the spacing between the light-emitting diode receiving sockets is selected to provide for an overlap of the light pattern emitted by adjacent ones of the light-emitting diodes received in the sockets.

4. The lamp assembly of claim 1, wherein the longitudinal axes of the sockets are non-parallel to each other.

5. The lamp assembly of claim 1, wherein the light-emitting diodes project outwardly beyond the top side of the fixture.

6. The lamp assembly of claim 1, further comprising:
   a mounting base;
   the fixture positioned in abutment to the mounting base; and,
   means for attaching the fixture to the mounting base.

7. The lamp assembly of claim 6, further comprising a lens disposed over the fixture and diodes and in abutment with the mounting base surrounding the fixture.

8. A lamp assembly for a motor vehicle comprising:
   (a) a fixture having a top side and a bottom side formed with a plurality of spaced apart light-emitting diode receiving sockets therethrough from the bottom side to the top side, the fixture comprising:
      a pair of identical fixture halves, each fixture half having an inner side, top side, and bottom side, the fixture halves being disposed in mating mirror image relationship with the inner sides thereof in facing abutment;
      each fixture half being formed with a plurality of spaced apart grooves in the inner side extending from the bottom side to the top side, each of the grooves of one fixture half being in mating facing registered relationship with a different one of the grooves in the other fixture half and mutually cooperating to define a different one of the light-emitting diode receiving sockets;
   (b) a light-emitting diode subassembly including a circuit board and a plurality of spaced apart light-emitting diodes electrically associated with the circuit board, the light-emitting diode subassembly being positioned with each of the light-emitting diodes each received in a different one of the sockets of the fixture.

9. The lamp assembly of claim 8, wherein each fixture half comprises a plurality of resilient fingers equal in number to the number of grooves, each finger having a proximal end attached to the top side of the fixture half and extending radially inwardly of a different one of the grooves toward the inner side of the fixture half.

10. The lamp assembly of claim 8, further comprising locating means associated with each fixture half coacting for properly locating the fixture halves in mating, mirror image facing relationship.

11. The lamp assembly of claim 8, further comprising fastening means associated with each fixture half coacting for attaching the fixture halves together in mating, mirror image facing relationship.

12. The lamp assembly of claim 8, wherein the longitudinal axes of the grooves of a fixture half are non-parallel to each other.

* * * * *